US006679188B1

United States Patent
Spagnoli, Jr.

(10) Patent No.: US 6,679,188 B1
(45) Date of Patent: Jan. 20, 2004

(54) TRAVELING PUZZLE TRAY AND CHILD'S ACTIVITY BOARD

(76) Inventor: Edward James Spagnoli, Jr., 3301 Woodmont Dr., Sarasota, FL (US) 34232

( * ) Notice: Subject to any disclaimer, the term of this patent is extended or adjusted under 35 U.S.C. 154(b) by 0 days.

(21) Appl. No.: 10/190,403

(22) Filed: Jul. 6, 2002

(51) Int. Cl.[7] .............................................. A47B 23/00
(52) U.S. Cl. ........................................ 108/44; 108/152
(58) Field of Search ............................ 108/44, 45, 25, 108/26, 152, 60, 65, 90

(56) References Cited

U.S. PATENT DOCUMENTS

| 2,503,602 | A | * | 4/1950 | Titley | 108/44 |
|---|---|---|---|---|---|
| 2,720,436 | A | * | 10/1955 | Covey | 108/44 |
| 5,046,433 | A | | 9/1991 | Kramer | |
| 5,370,060 | A | * | 12/1994 | Wang | 108/44 |
| 5,443,018 | A | * | 8/1995 | Cromwell | 108/44 |
| 5,813,354 | A | * | 9/1998 | Scott | 108/44 |
| 5,878,672 | A | * | 3/1999 | Ostermann et al. | 108/44 |
| 6,047,647 | A | * | 4/2000 | Laraia, Jr. | 108/61 |
| 6,502,900 | B1 | * | 1/2003 | Johnston | 108/44 |

FOREIGN PATENT DOCUMENTS

EP                     203021         *    5/1985

* cited by examiner

*Primary Examiner*—Jose V. Chen
(74) *Attorney, Agent, or Firm*—Dorothy S. Morse

(57) ABSTRACT

A tray assembly that includes an enlarged tray member, optional sorting boxes that can connect laterally to either side of the tray member, and detachable straps that allow support of the tray member by one or more automobile seats. Applications may include, but are not limited to, use by adult and child travelers to assemble jigsaw puzzles, create artwork, and play with model cars and other toys that are small in size or have multiple small parts associated therewith.

20 Claims, 3 Drawing Sheets

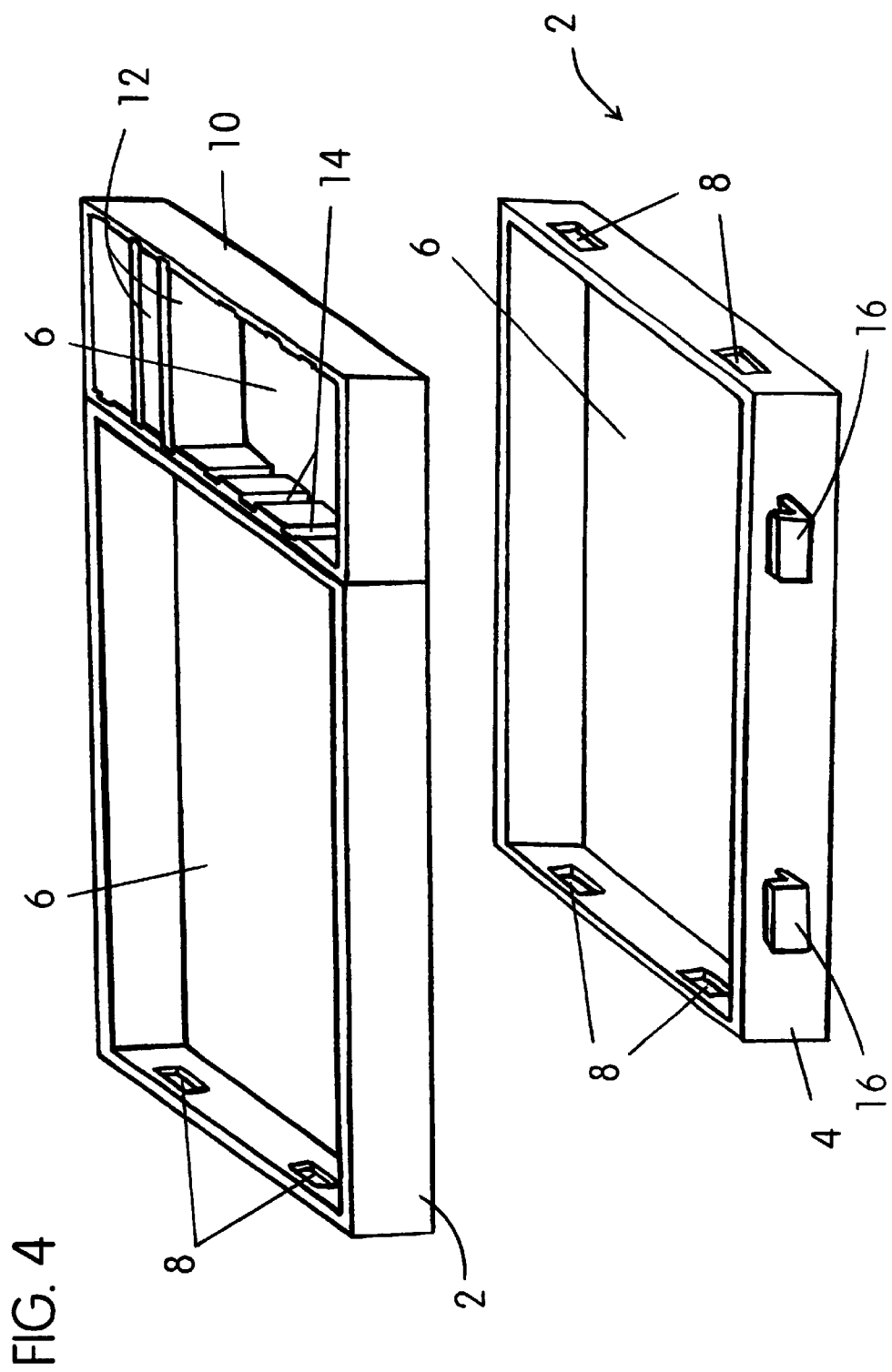

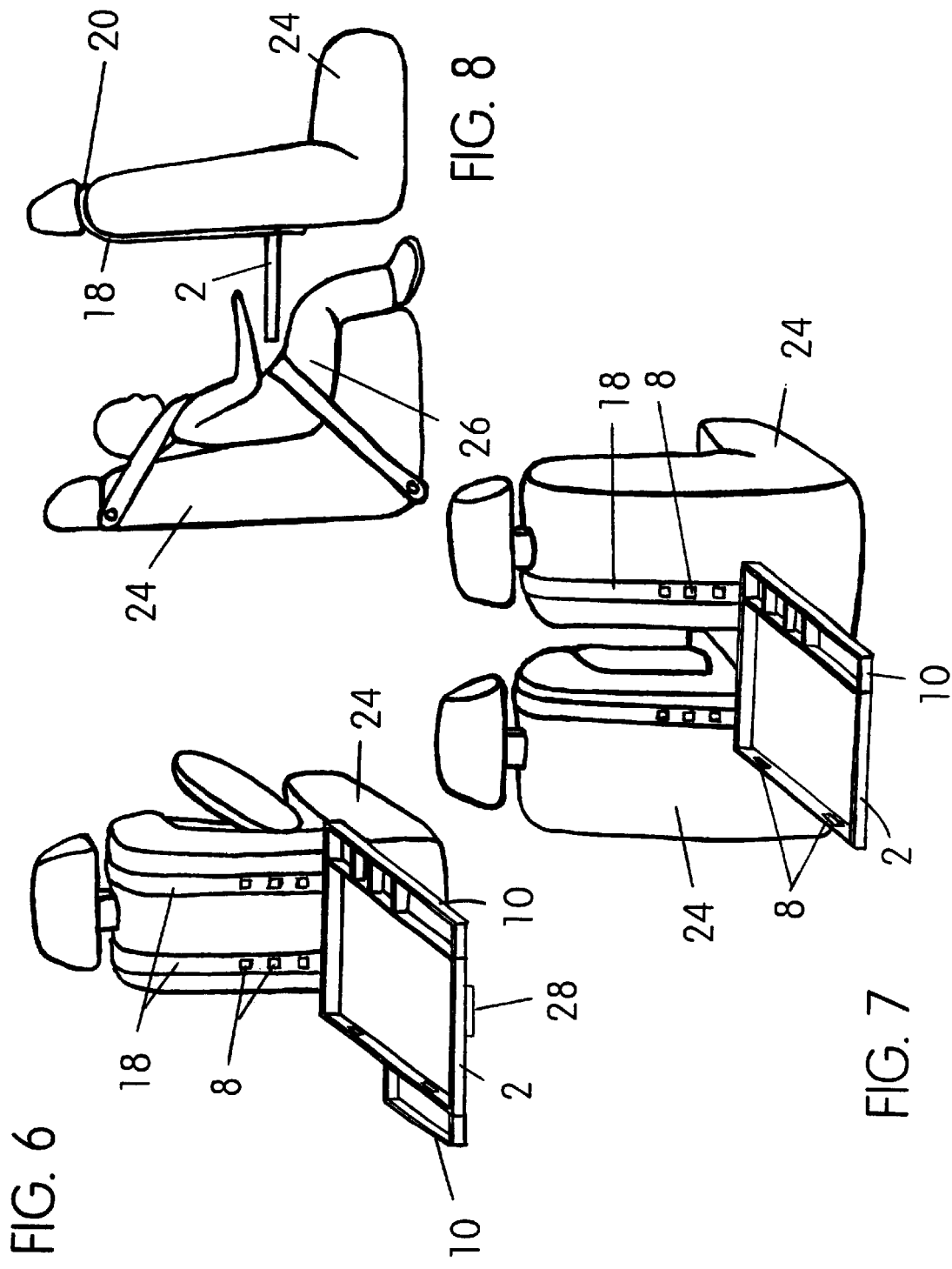

TRAVELING PUZZLE TRAY AND CHILD'S ACTIVITY BOARD

BACKGROUND

1. Field of Invention

This invention relates to devices that are attachable to the rear portion of a motor vehicle seat, such as folding tables and trays, specifically to a tray assembly that includes an enlarged tray member, at least one removable sorting box attachment that can connect laterally to either side of the tray member, and detachable straps that allow connection of the tray member to the rear portions of one or more motor vehicle seats. Applications may include, but are not limited to, use by travelers to assemble jigsaw puzzles, create artwork, play with model cars and other toys that are small in size or have multiple small parts associated therewith, and the like.

BACKGROUND

2. Description of Prior Art

Many people enjoy the challenge of assembling jigsaw puzzles. They are typically assembled at home and require a keen eye for identifying slight variations in shape and color. Due to their mind absorbing characteristics, jigsaw puzzles can maintain one's attention for hours. They would be ideal for passing the time during long road trips in a motor vehicle. However, until development of the present invention, there have been no convenient ways in which to assemble a jigsaw puzzle in a motor vehicle.

For assembly of a jigsaw puzzle, one typically needs a rigid, substantially horizontal assembly area, as well as a sorting area where one can gather pieces that are alike in color or shape. Commonly available lap trays that have a soft under-cushion downwardly depending from their bottom surfaces, are generally not large enough for assembling jigsaw puzzles, nor do they have a pre-defined sorting area. Further, even if they could be made sufficiently large for jigsaw puzzle assembly, they usually have little or no rim to prevent jigsaw puzzle pieces from falling off of its upper surface in the event of a sudden vehicle stop. Also, a large sheet of plywood placed upon one's lap as a foundation for assembly of a jigsaw puzzle would be too heavy in weight for extended travel, even if only one-fourth of an inch in thickness, and it also would have no rim to prevent the pieces from falling off of its upper surface in the event of a sudden vehicle stop. The present invention overcomes these deficiencies by providing a lightweight main puzzle assembly work area that can be placed upon one's lap, or suspended above it at a height selected for user comfort, and also provides adjacent puzzle piece sorting areas, all of which have the capability to retain puzzle pieces in the event of sudden vehicle stops.

The invention disclosed in U.S. Pat. No. 5,046,433 to Kramer (1991) is thought to be the closest to the present invention. However, there are important differences between the Kramer folding tray apparatus and the traveling puzzle tray and child's activity board of the present invention. The Kramer invention comprises a tray that is pivotally connected to a vertically oriented frame hung by flexible straps from the head-rest of a motor vehicle seat. The frame is further secured to the bottom of the seat back by a retaining device that downwardly extends from the frame. When not in use, the Kramer tray is pivoted upwardly into a vertically oriented retracted position wherein it can be secured to the frame by use of a latch or catch. The Kramer invention appears to have a short upwardly depending rim around the perimeter of its bottom surface. In contrast, the present invention has no latch or catch, no flexible straps that extend around a vehicle seat head-rest, no pivoting means attached to its tray, no frame connected between the straps and the tray, and no retaining means connected to the bottom of the vehicle seat. Instead, the present invention has a non-pivoting tray member detachably connected to straps which fit over the lateral portions of the back of one or more motor vehicle seats, and at least one sorting box attachment detachably connected to one side of the tray member. The present invention also is separable into component pieces for storage away from the vehicle seat, whereas the Kramer tray pivots into a retracted position against the back of the vehicle seat when not in use. Thus, the present invention provides an easy-to-use, lightweight, durable, simple in construction, puzzle piece retaining, and convenient means by which people can assemble jigsaw puzzles during extended road travel. No device is known that has all of the advantages of the present invention.

SUMMARY OF INVENTION

Objects and Advantages

The primary object of this invention is to provide an easy-to-use travel tray that can be employed in motor vehicles for assembling a jigsaw puzzle. It is also an object of this invention to provide a travel tray that is sufficiently large for assembling a jigsaw puzzle with at least 500 pieces. A further object of this invention is to provide a travel tray that can also be used as a child's activity board for creating artwork and playing with model cars and other toys that are small in size or have multiple small parts associated therewith. It is also an object of this invention to provide a travel tray that has means for sorting puzzle pieces by size and/or color, as well as for sorting and/or temporarily storing crayons, colored pencils, markers, small cars and trucks, and/or small accessory parts for toys that can easily be lost or misplaced It is a further object of this invention to provide a travel tray that is adjustable in height. A further object of this invention is to provide a travel tray that can be at least partially dismantled for compact storage. It is also an object of this invention to provide a travel tray that can be cost efficiently manufactured for widespread use.

As described herein, properly manufactured and used, the present invention would enable a person sitting in a rear seat of a motor vehicle to safely assemble jigsaw puzzle pieces without risk of loss of any pieces during a sudden vehicle stop, sharp turn, or steep grade. The most preferred embodiment of the present invention is easy to use as it has only three major components that readily connect to one another prior to use, an enlarged tray member, at least one sorting box, and straps that support the tray member and any attached sorting boxes from the back of a motor vehicle seat. The straps each have multiple apertures through its lower portion, which allow the tray member to be adjustable in height. Therefore a user can position the tray into a vertical position on or above his or her lap, according to preference. It is also contemplated in the most preferred embodiment of the present invention to provide a travel tray having a dimension sufficiently large for assembling a jigsaw puzzle with 500 or 750 pieces. Puzzles having 1000 or 1500 pieces are generally thought to be too large for effective assembly in a motor vehicle. Should a person sitting in the front seat of a motor vehicle want to assemble a jigsaw puzzle, the tray member could be detached from the straps and positioned directly on that person's lap. One or more sorting boxes could also be used. Since the tray member of the present invention is lightweight, even if it were resting on a user's lap, it would not restrict blood circulation to the user's legs during extended use. In addition to jigsaw puzzle assembly use, the travel tray can also be used as a child's activity board for creating artwork, completing other types of puzzles, completing schoolwork and activity books, playing board games, dice games, and/or card games, and playing with model cars and other toys that are small in size or have multiple small parts associated therewith. The number of compartments in each sorting box is not critical, but preferably each sorting box would contain five or six compartments. Further, the dividers in each sorting box can be made permanently attached to its rim, or removably connected therewith. When the dividers are removable, and a jigsaw puzzle having a lot of blue pieces for sky or water is selected for assembly, some of the dividers can be removed or repositioned to make more room for the greater than usual number of blue pieces anticipated. When the present invention is used for activities other than jigsaw puzzle assembly, the sorting box or boxes can be used for sorting and/or temporarily storing crayons, pens, colored pencils, markers, small cars and trucks, and or small accessory parts for toys that can easily be lost or misplaced One compartment can also be used to temporarily store idle dividers. The person using the present invention from a rear seat of a motor vehicle would first sit down on the rear seat, and then attach the straps to one or more of the seats in the row of seats immediately ahead of the user. If the user is positioned in a rear seat adjacent to a window, both straps would be laterally connected to the seat directly in front thereof. However, if the user is positioned in a middle rear seat, one strap could be optionally attached to the interior side of the seat on the driver's side of the motor vehicle and the other strap could be attached to the interior side of the rightmost passenger seat in the row immediately in front of the user. By placement of the present invention in front of the person in a center rear seat, all three passengers in that row of seats can assist in jigsaw puzzle assembly, if they so desire. Since the straps are laterally attached to the front seats, they do not interfere with an occupant's use of these seats. With little or no modification, the present invention could also be attached to other vehicle seats, such as those on a chartered bus, long-bed sport/utility vehicle, or van. Once the straps are in place, the tray member can be attached to the straps, and each sorting box used can then be attached to the tray member, or in the alternative, the sorting boxes can be first attached to the tray member, and the tray with attached sorting boxes subsequently being connected to the straps. If the height of tray member is not ideal for the user, the tray member can easily be separated from the straps, and then promptly reattached to a different portion of the straps. Dismantling of the tray member from the straps is also easy and promptly accomplished, whereafter the straps can be aligned with the tray and/or sorting boxes for compact handling and storage.

The description herein provides the preferred embodiment of the present invention but should not be construed as limiting the scope of the traveling puzzle tray and child's activity board invention. For example, variations in the thickness and height of the rims around the work area; the number and thickness of dividers used in the sorting box attachment, the material from which the sorting boxes and dividers are made as long as it is light in weight; the size and number of apertures through the straps; the size, number, and positioning of the connecting members and apertures used to attach each sorting box to the tray member; and whether the dividers are made removable from the sorting box; other than those shown and described herein may be incorporated into the present invention. Thus the scope of the present invention should be determined by the appended claims and their legal equivalents, rather than being limited to the examples given.

BRIEF DESCRIPTION OF THE DRAWINGS

FIG. 4 is a front perspective view of one of the sorting box attachments connected to one side of a tray member in the most preferred embodiment of the present invention.

FIG. 5 is a rear perspective view of a tray member in the most preferred embodiment of the present invention having connecting members outwardly depending from its back rim.

FIG. 6 is a front perspective view of a tray member in the most preferred embodiment of the present invention having one full-length sorting box attachment connected to its right side, a shortened sorting box attachment connected to its left side, and being mounted with two straps to the back of a motor vehicle seat.

FIG. 7 is a front perspective view of a tray member in the most preferred embodiment of the present invention with one sorting box attachment and being mounted via two straps between the backs of two automobile seats.

FIG. 8 is a side view of a tray member in the most preferred embodiment of the present invention with a sorting box attachment on its right side since no lateral openings are visible, and being mounted via straps to the rear surface of a motor vehicle seat in a position that rests on or immediately above the legs of a user.

DETAILED DESCRIPTION OF PREFERRED EMBODIMENTS

Figure 2:
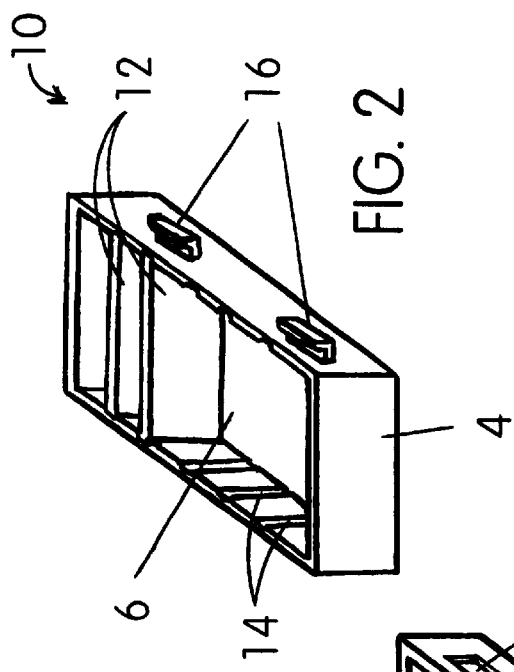
FIG. 2 is a front perspective view of one of the sorting box attachments in the most preferred embodiment of the present invention having connecting members on one of its elongated sides, channels along opposing sides of its interior surface, and upright removable dividers inserted between two of the opposing channels.
Figure 1:
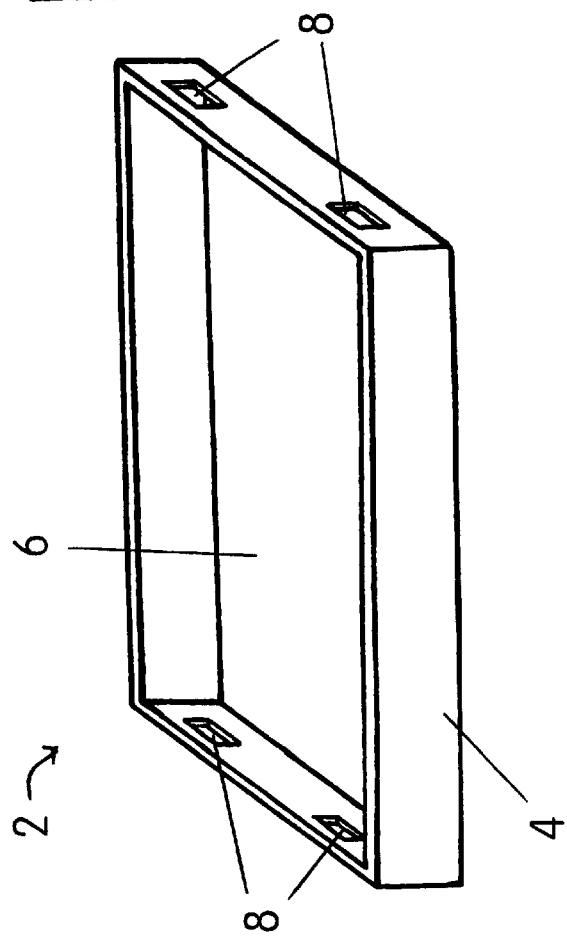
FIG. 1 is a front perspective view of the tray member in the most preferred embodiment of the present invention having an enlarged central work area, a short rim upwardly extending from the perimeter edge of the work area, and lateral openings on both sides of the rim for connection of one or more sorting box attachments.

FIG. 1 shows the tray member 2 in the most preferred embodiment of the present invention having an enlarged central work area 6, a short rim 4 upwardly extending from the entire perimeter edge of work area 6, and lateral openings or notches 8 on opposing sides of rim 4 for connection of one or more sorting box attachments 10, such as the sorting box attachment 10 shown in FIG. 2. Although not limited to, in the most preferred embodiment rim 4 would have a maximum height of approximately two inches, and to accommodate the assembly of jigsaw puzzles having 500 to 750 pieces, the length and width dimensions of tray member 2 respectively would be approximately twenty-four inches and eighteen inches. Since tray member 2 should be rigid for ease of puzzle piece assembly and light in weight for placement upon the lap of a user for extended periods of time, in the most preferred embodiment of the present invention, although not limited thereto, tray member 2 including work area 6 and rim 4 would be made from plastic material having an approximate thickness dimension of one-eighth of an inch. The size and configuration of lateral openings or notches 8 are not critical, as long as they properly engage the connecting members 16, shown in FIG. 2 that are attached to the sides of sorting box attachments 10, to fix each sorting box attachment 10 securely against tray member 2 during use.

FIG. 2 shows one of the sorting box attachments 10 in the most preferred embodiment of the present invention having two connecting members 16 on one of its elongated sides, channels 14 along opposing sides of its interior surface, and upright removable dividers 12 inserted between opposing channels 14. The use of removable dividers 12 is not critical, and the sorting box attachment 10 of the present invention can have permanently fixed dividers 12, or no dividers 12 at all, such as is shown in FIG. 6. Where no dividers 12 are contemplated for use, channels 14 would also be absent from sorting box attachment 10 (see FIG. 6). Although FIG. 2 shows two connecting members 16 attached to sorting box attachment 10, and two connecting members 16 are preferred, it is not contemplated for the connecting members 16 of the present invention to be limited to only two connecting members 16, and more than two connecting members 16 are also considered to be within the scope of the present invention. Further, although not shown, connecting members 16 may also be used on more than one side of sorting box attachment 10. The number of channels 14 can also vary, as long as opposing channels 14 are available for the upright positioning of each divider 12. Further, it is preferred that one divider 12 be provided for each pair of opposed channels 14. However, at the option of a user, less than the number of dividers 12 provided can be used at one time. And in the event that some dividers 12 are in use and some are idle, as shown in FIG. 6, an optional thin storage compartment 28 beneath tray member 2, beneath sorting box attachment 10, or on the side of sorting box attachment 10 opposed from connecting members 16 and depending outwardly from its rim 4, can be provided for the idle dividers 12. Also, in the alternative, idle dividers 12 could be placed in the space between the inside back perimeter of sorting box attachment 10 and the next divider 12 that is in use adjacent thereto. Although not critical, in the most preferred embodiment it is contemplated for the length dimension of sorting box attachment 10 to be close in size to the width dimension of tray member 2. However, in the alternative, and as is shown in FIG. 6, one or more smaller sorting box attachments 10, with or without dividers 12, can be attached laterally to each side of tray member 2. Also, at the preference of a user (not shown), sorting box attachments 10 can be mounted via connecting members 16 to either side of tray member 2, by simply rotating sorting box attachment 10 approximately 180° about its vertically oriented central axis. It is contemplated for connecting members 16 to be slightly oversized relative to openings or notches 8, and for connecting members 16 to be moved horizontally relative to its paired opening or notch 8 to achieve insertion therethrough.

Figure 3:
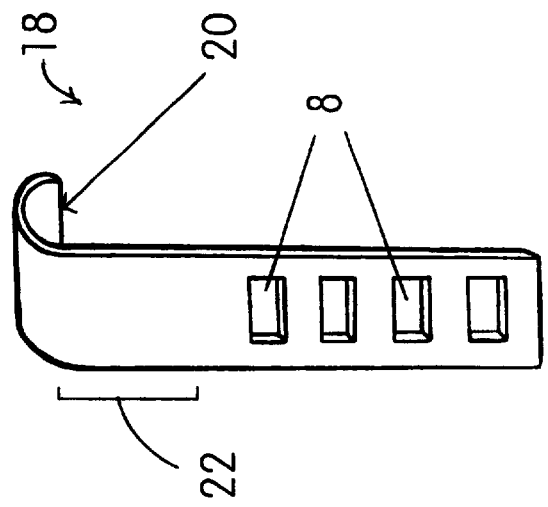
FIG. 3 is a front perspective view of one of the straps in the most preferred embodiment of the present invention having a small thickness dimension, a rearwardly curved upper end, and a plurality of apertures through its lower portion.

FIG. 3 shows one of the straps 18 in the most preferred embodiment of the present invention having a small thickness dimension, a rearwardly curved upper end 20, an upper portion 22 with no apertures therethrough, and a plurality of spaced-apart openings or notches 8 through its lower portion. The size and configuration of openings or notches 8 are not limited to that shown in FIG. 3. Also, the number of openings or notches 8 may vary. Although not limited to the following dimensions, it is contemplated in the most preferred embodiment of the present invention for each strap 18 used to have a thickness dimension of approximately one-eighth of an inch, a minimum length dimension of approximately twenty-four inches and a maximum length dimension of approximately twenty-five inches, a width dimension of approximately two inches, and for each opening or aperture 8 therethrough to have length and width dimensions of approximately one-half of an inch and one-fourth of an inch, respectively. Further, although not limited thereto, one opening or notch 8 could be placed through straps 18 every four to six inches. Also, although not limited thereto, the preferred spaced-apart distance between the tip of curved upper end 20 and upper portion 22 is approximately four to five inches. Further, the distal portion of curved upper end 20 that is contemplated for extending over the front portion of the supporting seat 24, although not limited thereto, is contemplated to have a length dimension of approximately one inch.

FIG. 4 shows one sorting box attachment 10 connected to the right side of tray member 2 in the most preferred embodiment of the present invention. Although not shown, attachment is made through insertion of connecting members 16 outwardly projecting from the rim 4 around sorting box attachment 10 through adjacent openings or notches 8 in the right side of the rim 4 around the work area 6 of tray member 2. As shown in FIG. 6, in the alternative, sorting box attachment 10 could also be positioned against the left side of tray member 2. Further, as shown in FIG. 6, two sorting box attachments 10 could be used at one time, each connected to opposing sides of tray member 2, or several smaller sorting box attachments 10, with or without dividers 12, could be connected to each side of tray member 2. Although the sorting box attachment 10 shown in FIG. 3 extends the full width of tray member 2, the length dimension of sorting box attachment 10 relative to the width dimension of tray member 2 is not critical, and it is contemplated for each sorting box attachment 10 to be shorter than the width dimension of tray member 2, longer than the width dimension of tray member 2, or an equivalent dimension. Further, when the length dimension of sorting box attachment 10 is longer than the width dimension of tray member 2, it can extend toward the user, or if the configuration of the seat 24 to which tray member 2 is attached permits, sorting box attachment 10 can extend in a direction away from the user. However, when the length dimension of sorting box attachment 10 is longer than the width dimension of tray member 2, it cannot be significantly longer without interfering with the arm movements of the user when the surplus length is positioned toward the user, or placing pieces too far away from the user's view or reach when the surplus length is positioned away from the user. From a practical standpoint, it is preferred that each sorting box attachment 10 used have a length dimension that is equivalent to, or shorter than, the width dimension of tray member 2.

FIG. 5 shows tray member 2 having a central work surface 6, a rim 4 upwardly depending from work surface 6, opposing openings or notches 8 through two sides of rim 4, and connecting members 16 rearwardly depending from the outside surface of one of the sides of rim 4 not having openings or notches 8. Although FIG. 5 shows all of the connecting members 16 and openings or notches 8 in tray member 2 both appearing to be in a horizontally extending positions, the orientation of each is not critical as long as the paired connecting members 16 and openings or notches 8 are oriented in an appropriate direction for secure connection with one another during use. Further, the size and configuration of connecting members 16 and openings or notches 8 are not limited to that shown in FIGS. 1–2 and 4–5, and it is contemplated for the present invention to comprise any size and known means of quick-release attachment that would be cost effective and convenient for joining sorting box attachments 10 to tray member 2 and/or tray member 2 to straps 18.

FIGS. 6–8 show the most preferred embodiment of the present invention during use. FIG. 6 shows tray member 2 having one sorting box attachment 10 connected to its right side, a shorter sorting box attachment 10 connected to its left side, and being mounted with two straps 18 to the back of a single automobile seat 24, while FIG. 7 shows tray member 2 with sorting box attachment 10 on its right side, since no openings or notches 8 are visible, and being mounted via two straps 18 between the backs of two automobile seats 24. In addition, FIG. 8 shows tray member 2 with one sorting box attachment 10 connected to its right side and being mounted via straps 18 to the rear surface of a motor vehicle seat 24 in a position above the legs of a user 26. FIG. 8 shows the curved upper end 20 of strap 18 extending only a short distance over the upper surface of seat 24, so as not to interfere with the use of seat 24 by an occupant (not shown). Also in FIGS. 6–8, tray member 2 is shown in a substantially horizontally extending orientation. Openings or notches 8 in straps 18 allow for the vertical adjustability of tray member 2 and any connected sorting box attachment 10, so that tray member 2 can be positioned upon or immediately above the lap of a user 26, or higher if more comfortable for user 26. To raise or lower tray member 2 relative to straps 18, user 26 would simply have to angle tray member 2 slightly to release connecting members 16 from engagement with an associated opening or notch 8 in the lower portion of straps 18, and then perform a similar but reversed motion to cause engagement of connecting members 16 with a higher or lower opening or notch 8 in the lower portion of straps 18. When the jigsaw puzzle (not shown) or other activity requiring tray member 2 is complete, user 26 can simply remove tray member 2 from its connection to straps 18 and place tray member 2 vertically between one of the motor vehicle seats 24 and an adjacent door (not shown), under one of the automobile seats 24, elsewhere within the passenger compartment of the motor vehicle, or in the trunk of the motor vehicle if it has one. At the option of user 26, straps 18 may be removed from the seat 24 supporting it, and sorting box attachments 10 may be detached from tray member 2. Although not critical, it is contemplated in the preferred embodiment of the present invention for tray member 2, sorting box attachments 10, rims 4, dividers 12, straps 18, and connecting members 16 to all be made from plastic, or other lightweight material such as but not limited to aluminum. If a jigsaw puzzle is incomplete at the end of a road trip or road trip segment, tray member 2 can be disconnected from straps 18 without adversely affecting the positioning of puzzle pieces within work area 6, whereafter tray member 2 could be left overnight on the seat 24 occupied by user 26, or taken with user 26 into a motel or other nighttime lodging. As an option, sorting box attachments 10 can be separated from tray member 2 and placed upon work surface 6 for easier transport. Although FIGS. 1–8 show the most preferred embodiments of the present invention, they are simply provided as examples, and numerous other obvious variations in subject matter are also considered to be within the scope of the present invention.

What is claimed is:

1. A portable tray assembly that is usable for the construction of a jigsaw puzzle during travel in a motor vehicle having at least one pair of tandem motor vehicle seats, and which can also be used by adults and children as a support surface for reading material, writing materials, artwork supplies, craftwork supplies, small toys and other small objects, said tray assembly comprising:

a lightweight and substantially rectangular tray member having a horizontally extending upper surface with a minimum surface area that is slightly larger than the footprint of commonly-available rectangular two-dimensional 500-piece jigsaw puzzles and a maximum surface area that permits prompt horizontal removal of said tray member from the types of motor vehicles intended for use therewith, said tray member also having an upstanding perimeter rim with an outer surface and the portion of said rim to be positioned remote from a user having a plurality of quick-release protruding connecting members outwardly depending from said outer surface, said perimeter rim also having opposed lateral portions each with a plurality of openings therethrough and a minimum height dimension sufficient for retaining jigsaw pieces on said upper surface during its transport to and from a motor vehicle as well as during motor vehicle travel;

at least one sorting box having a hollow interior, an open upper end, and one side wall with an outside surface configured for positioning against one of said opposed lateral portions of said perimeter rim, said at least one sorting box also having a plurality of quick-release protruding connecting members outwardly depending from said outside surface of said side wall with each of said quick-release protruding connecting members being slightly smaller than said openings in said perimeter rim and configured for secure connection thereto so as to place said at least one sorting box in a usable position that is substantially co-planar with said tray member and cause said at least one sorting box to outwardly depend from said perimeter rim in a lateral position relative to a user; and a plurality of straps each having a substantially planar lower end, a central portion without openings, and a curved upper end configured and dimensioned for extension over and being suspended from the lateral upper portion of a motor vehicle seat, said lower end having a plurality of vertically spaced-apart openings therethrough that each are slightly larger than one of said quick-release protruding connecting members on said outer surface of said remote portion of said perimeter rim;

whereby when said curved upper ends of said straps are secured to one or more front motor vehicle seats and said tray member is secured to said straps, said tray member becomes extended in a substantially horizontal position over the lap of a user sitting in a rearward motor vehicle seat immediately behind said straps, and when said at least one sorting box is secured to said opposed lateral portions of said perimeter rim, said quick-release protruding connecting members allow for prompt vertical height adjustment of said tray member and prompt assembly configuration change according to need during use, said reusable straps are readily removable from the supporting vehicle seats when a current use is concluded, and when employed for jigsaw puzzle assembly during motor vehicle travel, said tray member is easily removable from said straps at a destination and further removable from the motor vehicle in a horizontally extending position without affecting the location of sorted jigsaw puzzle pieces so that a partially assembled jigsaw puzzle can remain substantially undisturbed in said tray member for continuation of assembly at a later time in or away from the motor vehicle.

2. The assembly of claim 1 wherein said straps each have a minimum length dimension of approximately twenty-four inches, a maximum length dimension of approximately twenty-five inches, and a minimum width dimension of approximately two inches, and wherein said openings through said lower ends of said straps have a minimum spaced-apart distance of approximately four inches.

3. The assembly of claim 1 wherein said openings and said quick-release protruding connecting members are all substantially rectangular in configuration.

4. The assembly of claim 3 wherein said at least one sorting box comprises at least one divider.

5. The assembly of claim 4 having a sorting box with at least two dividers and said dividers defining compartments selected from a group consisting of compartments with uniform length dimensions and compartments having different length dimensions.

6. The assembly of claim 4 wherein at least one said divider is selected from a group consisting of removable dividers and non-removable dividers.

7. The assembly of claim 6 wherein each said divider has opposing ends and said sorting box further comprises at least one pair of opposing channels that are configured and dimensioned for receiving said opposing ends.

8. The assembly of claim 4 further comprising a storage compartment under said tray member in a position for easy user access of contents therein, said storage compartment having a small thickness dimension and a front opening that is sufficiently wider than said dividers for easy insertion and removal of idle ones of said dividers from said storage compartment.

9. The assembly of claim 1 wherein said tray member, each said sorting box, and said straps are all made from plastic material.

10. The assembly of claim 9 wherein said plastic material has a minimum thickness dimension of approximately one-eighth of an inch.

11. The assembly of claim 1 wherein said tray has a width dimension and said at least one sorting box has a length dimension, and wherein said length dimension and said width dimension are selected from a group consisting of trays and sorting boxes having said width dimension and said length dimension substantially similar in size, trays and sorting boxes having said width dimension being longer than said length dimension, and trays and sorting boxes having said length dimension being longer than said width dimension.

12. A portable traveling tray assembly having components that are separable for compact transport and storage, and which can be used in association with tandem motor vehicle seats by adults and children as a support surface during travel for the assembly of jigsaw puzzles, reading material, writing materials, artwork supplies, craftwork supplies, small toys and other small objects, said tray assembly comprising:

a tray member with a horizontally extending work area and a minimum surface area sufficient for supporting a conventional planar 500-piece jigsaw puzzle in its fully assembled form, said tray member also having an upstanding rim around said work area with opposed lateral members and a plurality of quick-release protrusions outwardly depending from said upstanding rim; and a plurality of straps each having a substantially planar lower end, a middle section without openings therethrough, and a curved upper end configured for extending over and being suspended from a lateral portion of the upper surface of a motor vehicle seat, said lower end having a plurality of holes therethrough in vertical array, with each said strap having the same number and spacing of said holes, each said hole being configured for quick-release engagement with one of said protrusions, the number of said holes exceeding the number of said protrusions so that when said upper ends of said straps are secured over the lateral portion of the upper surface of a motor vehicle seat and said tray member is secured to said lower portions of said straps, said tray member is vertically adjustable into a plurality of substantially horizontal positions over the lap of a user sitting in a second motor vehicle seat immediately rearward from said straps, and said tray member is easily removable from said straps for convenient user access to the second motor vehicle seat, with said tray member also being removable from said straps and the motor vehicle so as to allow a partially finished jigsaw puzzle to be taken from the motor vehicle without interim disassembly for later completion in or away from the motor vehicle.

13. The assembly of claim 12 further comprising at least one sorting box having a hollow interior and an open upper end, said at least one sorting box also being configured to depend outwardly from said upstanding rim of said tray member so that said at least one sorting box is co-planar with said tray member, securely connected to said tray member and positioned adjacent to a user wherein objects within said hollow interior are readily viewed and accessed by the user.

14. The assembly of claim 13 wherein said at least one sorting box further comprises at least one divider.

15. The assembly of claim 14 wherein at least one said divider is selected from a group consisting of removable dividers and non-removable dividers.

16. The assembly of claim 12 wherein said tray has a width dimension and said at least one sorting box has a length dimension, and wherein said length dimension and said width dimension are selected from a group consisting of trays and sorting boxes having said width dimension and said length dimension substantially similar in size, trays and sorting boxes having said width dimension being longer than said length dimension, and trays and sorting boxes having said length dimension being longer than said width dimension.

17. A method for manufacturing a portable traveling tray assembly that can be used in association with motor vehicle seats by adults and children as a support surface during travel for the assembly of jigsaw puzzles, reading material, writing materials, artwork supplies, craftwork supplies, small toys and other small objects, said method comprising the steps of:

providing a tray member with a horizontally extending work area sufficient for supporting a conventional two-dimensional 500-piece jigsaw puzzle in its fully assembled form and an upstanding rim around said work area with opposed lateral members;

also providing a plurality of straps each having a substantially planar lower end, a middle section without openings, and a curved upper end configured for extending over and being suspended from a lateral portion of the upper surface of a motor vehicle seat;

creating a plurality of protrusions that outward depend from said upstanding rim and are configured for quick release from a hole; and creating a plurality of holes in vertical array through said lower end of each of said straps, with the number of said holes in each said strap being identical so that when said upper ends of said straps are secured over the lateral portion of the upper surface of a motor vehicle seat and said tray is secured to said lower portions of said straps, said tray is vertically adjustable into a plurality of substantially horizontal positions over the lap of a user sitting in a second motor vehicle seat immediately rearward from said straps and said tray member is also easily removable from said straps for convenient user access to the second motor vehicle seat, with said tray member also being removable to allow a partially assembled jigsaw puzzle to be taken from the motor vehicle for later completion without interim disassembly.

18. The method of claim 17 further comprising the steps of providing at least one sorting box with an open upper end and a hollow interior, creating a plurality of additional protrusions that outwardly depend from said sorting box; and creating a plurality of additional holes through said upstanding rim of said tray member, with each of said additional holes being configured to securely engage one of said additional protrusions to position said at least one sorting box in a co-planar orientation with said tray member and in a position adjacent to a user wherein objects within said hollow interior can be readily viewed and accessed by the user.

19. The method of claim 18 further comprising the steps of providing at least one divider and securing said at least one divider within said at least one sorting box.

20. The method of claim 19 wherein said step of securing each said divider within said at least one sorting box further comprises at least one said divider being removably secured within said at least one sorting box.

* * * * *